Nov. 26, 1940.    J. MUROS    2,223,294
SHAVING IMPLEMENT
Filed Aug. 9, 1937
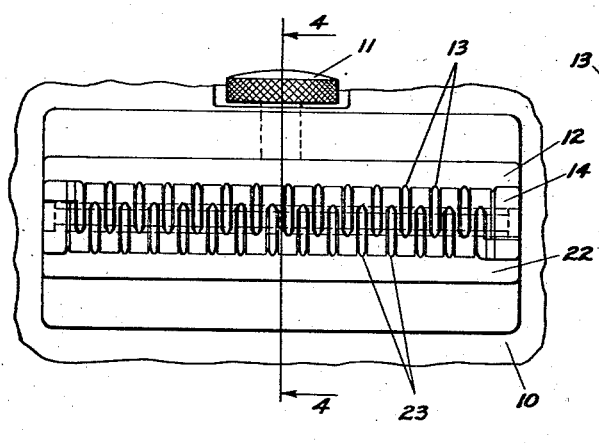
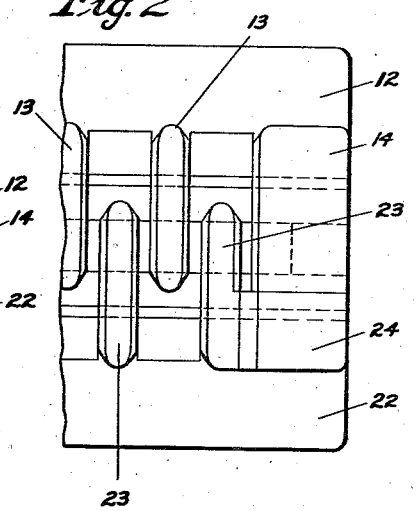
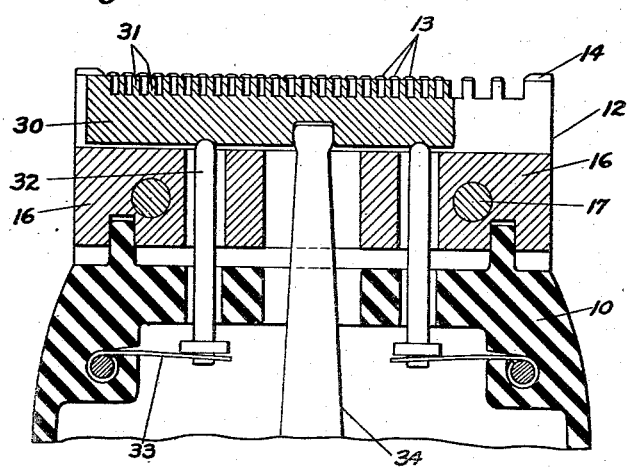
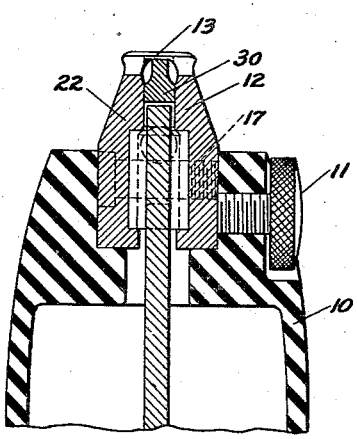
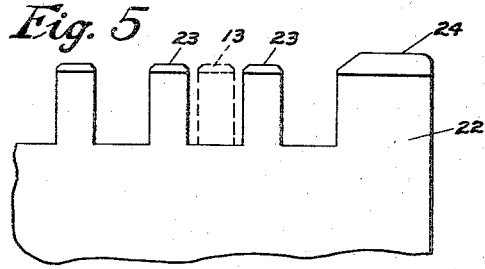
INVENTOR
BY Joseph Muros
ATTORNEY Patented Nov. 26, 1940

2,223,294

UNITED STATES PATENT OFFICE 2,223,294

SHAVING IMPLEMENT

Joseph Muros, Cambridge, Mass., assignor to Gillette Safety Razor Company, Boston, Mass., a corporation of Delaware Application August 9, 1937, Serial No. 158,013

10 Claims. (Cl. 30—43)

This invention relates to dry shaving implements of the types which include stationary shearing or guard members having a series of shearing teeth separated by narrow slots or grooves usually serving as hair passages. The present invention consists in a construction by which the spaces or passages between adjacent shearing teeth of the series are formed partly in one member and partly in the other member. For example, each member may be formed with teeth projecting transversely with relatively wide spaces between them and the members then assembled and secured in opposed relation so that the teeth of both members co-operate to present a single series of shearing teeth arranged with relatively narrow spaces.

Heretofore in manufacturing dry shaving implements the stationary shearing member has been made by cutting a series of very fine slots in a solid bar of steel and in this operation it is frequently necessary to form as many as thirty slots each having a width approximating .008" or .009". The formation of such fine slots in a bar of high carbon steel having suitable edge-holding properties presents serious mechanical difficulties. Gang cutters have been used but the breakage of a single cutter in the gang necessitates disassembling the whole gang for replacement of one of the delicate individual cutters. Under commercial conditions breakage has been so frequent as practically to force abandonment of this plan.

An object of the present invention is to overcome the difficulties above discussed and I have succeeded in accomplishing this valuable result in the manner above suggested. For example, I may form each one of the shearing members with a series of teeth .030" in width separated by spaces .048" in width and then assemble the two members in opposed relation with the teeth of one member symmetrically located in the spaces of the other member and overlapping or extending past each other to form the shearing zone of the implement. Under these circumstances the clearance between each side of each tooth and the wall of the adjacent tooth will be .009", which is a suitable width for a hair passage between shearing teeth, and at the same time this result has been attained by the use of no cutter or milling tool thinner than .048". Accordingly by this expedient I am able to increase the width of the slotting of the cutter by more than five times as compared to that formerly used and may thus employ a sturdy and rugged tool not subject to breakage.

The advantages of the implement of my invention extend even further than I have just indicated. In fact, where a spacing of the order of .048" is required it is entirely practical to employ punch and die methods in forming the required teeth. The net result is the provision of a dry shaving implement which may be produced by ordinary machine shop procedure, in which the hair passages may be as fine as desired and in which the necessity for special manufacturing operation requiring unusual skill and special machines is entirely obviated In another aspect my invention consists in a dry shaving implement having shearing teeth disposed with relatively close spacing or co-operatively arranged so that the individual teeth have the maximum possible width and strength while the spaces forming hair passages between them are reduced to receive a hair with only limited clearance. By this arrangement the inner overhanging ends of the shearing teeth are guarded on both sides by the body portions of adjacent, oppositely directed teeth which present smooth surfaces to the user's face.

These and other features of the invention will be best understood and appreciated from the following description of a preferred embodiment thereof, selected for purposes of illustration and shown in the accompanying drawing, in which:

Fig. 1 is an end or plan view of the implement, shown on an enlarged scale, with portions of the casing broken away;

Fig. 2 is a similar fragmentary view on a still larger scale;

Fig. 3 is a view in longitudinal section corresponding to Fig. 1;

Fig. 4 is a view in cross-section on the line 4—4 of Fig. 1;

Fig. 5 is a fragmentary view in side elevation of one of the side members of the implement on the enlarged scale of Fig. 2.

As already noted the invention may be embodied in any dry shaving implement having a series of stationary shearing teeth separated by narrow grooves and in its general construction the implement herein shown is merely illustrative of dry shaving implements of that type. The illustrated implement includes in its organization an elongated casing 10 of moulded material, such as "Bakelite" shaped to serve as a handle and also as a housing for a small motor and actuating mechanism by which the implement is operated. The casing is formed at its upper end with spaced flanges to receive the metallic head of the implement, one of these flanges being threaded to receive a clamping screw 11.

The head of the implement includes a pair of separate similar side members 12 and 22 of high grade steel, rectangular in their general outline and rigidly secured together by means of square spacing blocks 16 and transverse screws 17. The screws 17 are countersunk into one of the members and threaded into the other as shown in Fig. 4.

The side member 12 has an inwardly tapering outer wall and is provided at its upper edge with a series of transversely extending overhanging teeth 13. These teeth are parallel in arrangement and separated by spaces which are of greater width than the width of the teeth. For example, the teeth may be .030" in width and may be separated by spaces .048" in width. The teeth are disposed in parallel relation and overhang the inner wall of the side member 12 by the same amount. They are slightly bevelled upon their upper corner edges and rounded or bevelled at each end while their lower transverse edges provide oppositely directed shearing edges. It will be noted that in shaping the teeth 13 in the side member 12 it is unnecessary to use a cutter of less than .048" in width, this being of course, a substantial dimension.

The opposite side member 22 is similarly shaped and similarly provided with transversely extending overhanging teeth 23. The two members 12 and 22 are assembled in opposed relation, being so designed that in assembled position the teeth 23 of the side member 22 are located symmetrically in the spaces between the teeth 13 of the side member 12 or vice versa. As best shown in Fig. 2, it will be seen that the inner ends of the teeth 13 and 23 extend past each other with clearance into interleaved relation. The shearing zone is formed by this area of overlap of the teeth and the clearance between adjacent teeth is determined by the dimensions of the teeth and spaces of the two assembled members. In the illustrated example the teeth 13 will be separated from the teeth 23 by slots serving as hair passages which are .009" in width. This is a satisfactory width for hair passages, permitting movement of the hairs into the shearing zone as the implement is moved on the face of the user and at the same time preventing the hairs from being deflected to any appreciable extent in the shearing operation, thus insuring close shaving. It will be noted that in the shaving zone one side of each passage is supplied by the teeth of one side member and the other side of the passage is supplied by the teeth of the other side member. This is a new relationship in dry shaving implements and makes it entirely practicable to form rapidly, accurately and without special machinery shearing teeth separated by hair passages of any desired degree of fineness. The assembled relation of the teeth is well shown in Fig. 5 in which the teeth 23 of the side member 22 are shown in full lines and a single tooth 13 of the side member 12 is shown in dotted lines in one of the spaces.

The side member 12 is provided at each end with a wide and elongated guard projection 14 extending somewhat above the plane of the outer faces of the shearing teeth 13 and being of substantially greater width than the teeth. Similar guard projections 24 are provided at both ends of the side member 22 so that in the assembled implement all four corners are reinforced and guarded against distortion. The slots forming the teeth 13 and 23 are carried down into the body of the respective side members 12 and 22 as shown in Figs. 4 and 5 sufficiently to provide hair passages through which hairs may pass freely into the implement from either side thereof.

The reciprocatory cutter member may be of any desired construction. As herein shown it comprises an elongated bar 30 substantially rectangular in cross-section and transversely slotted in its upper face and so provided with a series of shearing teeth 31. The cutter member 30 is normally pressed upwardly so that its shearing teeth 31 yieldingly engage the lower faces of the stationary shearing teeth and for this purpose has a pair of spaced depressions in its lower face each of which receives the upper end of a pin 32 arranged to pass upwardly through bores in the casing 10 and in the spacing blocks 16 and being supported at its lower end by a flexed leaf spring 33. The leaf springs 33 are each received in a socket provided for the purpose in the inner walls of the casing 10. The cutter 30 is also provided with a recess for the reception for the upper end of an oscillatory operating lever 34 which it will be understood is rapidly vibrated by the motor contained in the casing 10 but not herein shown.

It will be noted that the overhanging end or point of each tooth is guarded by the body portions of adjacent teeth and the possibility of digging or scratching the face thus eliminated. For example, the inwardly directed points of the teeth 13 are located between and guarded by solid portions of teeth 23 which present smooth surfaces to the face.

It will be further noted that the implement presents on each side a series of relatively wide openings which act to collect and direct the hairs toward the shearing zone. Before this is reached, however, the end of the opposite shearing tooth is encountered and the single wide space is divided into two narrow hair passages separated by a shearing tooth.

The operation of the implement herein described is like that of any dry shaving implement of this type. In its movement across the face of the user the hairs enter the hair passages between adjacent shearing teeth 13 and 23 and arrive at the shearing zone in which they are sheared by the movement of the shearing teeth 31 across the lower edges of the shearing teeth 13 and 23.

Having thus disclosed my invention and described a specific embodiment thereof for illustrative purposes but not in a limiting sense, I claim as new and desire to secure by Letters Patent:

1. A dry shaving implement including in its structure separate stationary members having teeth projecting transversely between relatively wide spaces, said members being secured in opposed relation whereby the teeth of both members co-operate to present a shearing zone with regular spaces of less width than the spaces of either member separately.

2. A dry shaving implement including in its structure separate outer stationary members and an inner reciprocatory cutter, said outer members having shearing teeth projecting transversely with relatively wide spacing and being disposed in opposed relation to present a zone of shearing teeth assembled with relatively narrow spacing.

3. A dry shaving implement including in its structure separate stationary side members each having transversely projecting teeth about .030 inch in width spaced about .048 inch apart, the two members being assembled so that the teeth of one occupy the spaces of the other, thus providing hair passages about .009 inch in width between them.

4. A dry shaving implement including in its structure separate side members having overhanging shearing teeth of substantial width separated by spaces also of substantial width, said members being assembled and secured together with their teeth interleaved with a clearance of about .009 inch between them.

5. A dry shaving implement including in its structure separate side members each having a series of overhanging shearing teeth of substantial width separated by spaces also of substantial width, said members being assembled and secured together with their teeth overlapping throughout a part of their length, thereby forming an intermediate zone in which the teeth are separated by narrow spaces.

6. A dry shaving implement having oppositely directed transverse shearing teeth separated at the outer edges of the implement by wide spaces and each wide space divided toward the center of the implement into two narrower spaces by an interposed tooth extending from the opposite side of the implement.

7. A dry shaving implement having separate opposed side members with shearing teeth spaced along their upper edges and extending transversely, the inner end of each tooth on one member being guarded between the body portions of adjacent teeth projecting inwardly from the other member.

8. A dry shaving implement having separate opposed side members with overhanging teeth projecting inwardly in alternating relation, the overhanging end of each tooth on one member being terminated within the plane of the outer face of the other member and so guarded on each side by teeth of said other member teeth.

9. A dry shaving implement including in its structure separate stationary side members each having an upright body portion surmounted by a series of spaced inwardly extending shearing teeth of substantially uniform width from end to end, the teeth of the two members being arranged in alternating relation with spaces between them and the opposed boundaries of each space being formed by teeth of a different one of said members.

10. A dry shaving implement having separate side plates, each having a series of spaced inwardly projecting teeth, the plates being secured in assembled relation with the teeth of one plate entering the spaces between the teeth of the other plate and extending inwardly beyond the center of the implement and both plates being slotted to permit the free passage of hairs through the implement from both sides thereof.

JOSEPH MUROS.